US006236856B1

(12) United States Patent
Abbadessa

(10) Patent No.: US 6,236,856 B1
(45) Date of Patent: May 22, 2001

(54) DETERMINING INFORMATION ABOUT CELLULAR MOBILE RADIO NETWORKS

(75) Inventor: Daniele Abbadessa, Wokingham (GB)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/195,264

(22) Filed: Nov. 18, 1998

(30) Foreign Application Priority Data

Nov. 26, 1997 (EP) .................................................. 97309515

(51) Int. Cl.[7] .................................................. H04Q 7/20
(52) U.S. Cl. ........................ 455/423; 455/517; 455/67.1
(58) Field of Search .................................. 455/466, 414, 455/517, 435, 423, 424, 67.1, 561; 370/328, 336, 337, 347

(56) References Cited

U.S. PATENT DOCUMENTS 5,648,962 * 7/1997 Pirinen .................................. 370/338
6,091,950 * 7/2000 Remy .................................... 455/423

FOREIGN PATENT DOCUMENTS

738091A1    10/1996   (EP) .

OTHER PUBLICATIONS

Pautet et al., GSM protocol architecture: radio subsystem signalling, May 19, 1991.*
European Search Report, EP 97 30 9515, Apr. 20, 1998.
Revista Espanola De Electronica, No. 488–489, Jul. 1995, pp. 36–41 B. Schoeppe, "Equipos de Prueba para la Interfaz GSM A bis".

ITG–Fachberichte, No. 124, Sep. 1, 1993, pp. 423–432, Fingerle, B–M, "GSM Signalisierung in der Praxis".

* cited by examiner

*Primary Examiner*—Stella Woo
*Assistant Examiner*—Melur Ramakrishnaiah

(57) ABSTRACT

A method and apparatus are disclosed for determining information about a cellular mobile radio network (such as a GSM network) comprising a fixed part providing radio coverage in a plurality of cells and mobile stations for communicating with the fixed part across a radio interface. Each cell uses a group of control channels which are configured in accordance with configuration messages which are passed in the network when the cell is to be configured or reconfigured. The method comprising the steps of: monitoring signalling messages of a cell which are passed in the network (for example across a GSM Abis interface) generally more frequently than the configuration messages; detecting (S48,S50) monitored messages of predetermined types (such as CHAN RQD, CHAN ACTIV, EST REQ, PAGING CMD, SMSBREQ or SMSBC); and extracting (S52–S62) information from the detected messages relating to the control channel group configuration of the cell.

16 Claims, 6 Drawing Sheets

DETERMINING INFORMATION ABOUT CELLULAR MOBILE RADIO NETWORKS

DESCRIPTION

This invention relates to a method of and an apparatus for determining information about cellular mobile radio networks. The invention is applicable to GSM networks, which in the context of this specification is to be taken to include, for example, DCS1800 and PCS1900 networks, and also to other non-GSM networks.

In particular, a first aspect of the present invention relates to a method of determining information about a cellular mobile radio network comprising a fixed part providing radio coverage in a plurality of cells and mobile stations for communicating with the fixed part across a radio interface, each cell using a group of control channels which are configured in accordance with configuration messages which are passed in the network when the cell is to be configured or reconfigured.

As will be described in detail below, in a GSM network, the control channel group configuration parameters are known as CCCH_CONF, BS_AG_BLKS_RES and BS_PA_MFRMS, and they are passed on the Abis interface between a base station controller and a base transceiver station in messages such as the BCCH INFO, SACCH FILL and SACCH INFO MODIFY messages when a cell configuration or reconfiguration takes place. An operator might also decide to send these messages occasionally at other times. It would be desirable to be able to monitor the Abis interface to determine these control channel configuration parameters. They can be used to determine the cell capacity and can be combined with traffic data to build up precise information about the usage of the cell, traffic load and patterns, etc. However, cell configuration or reconfiguration seldom takes place.

The present invention is concerned more particularly with a technique for determining information about the control channel group configuration without having to wait until a cell reconfiguration takes place.

In accordance with the first aspect of the invention, the method of determining information about a cellular mobile radio network comprises the steps of: monitoring signalling messages of a cell (preferably at the Abis interface in the case of GSM) which are passed in the network generally more frequently than the configuration messages; detecting one of the monitored messages which is of a first predetermined type; and extracting information from the detected message relating to the control channel group configuration of the cell. In its broad form, this aspect of the invention does not necessarily enable all information about any control channel group configuration to be obtained. However, the information can be obtained without having to wait for a cell reconfiguration.

In the case where the first type of message contains information sufficient to determine some of the control channel group configuration information, but which is insufficient to determine the control channel group information for all of the control channel groups, the method preferably further includes the steps of: detecting at least one other of the monitored messages which is of another predetermined type; and extracting further information from the other detected message relating to the control channel group configuration of the cell.

In the case where the radio interface employs time division multiple access, the detected message (or at least one of the detected messages) may be one which includes an indication of a timeslot number for a timeslot in which the message is to be sent, or was received, across the radio interface, and in this case the extracting step for the type of message (or at least one of the types of message) preferably includes the steps of: extracting the timeslot number from the detected message; and testing its value. In the case of a GSM network, the last-mentioned type of message may be, for example, a CHAN RQD, CHAN ACTIV, EST REQ, PAGING CMD, SMSBREQ or SMSBC message, as defined by GSM standard 08.58.

Also in the case where the radio interface employs time division multiple access, the detected message (or at least one of the detected messages) may, alternatively or additionally, be one which includes an indication of a frame number of the message, and in this case the extracting step for the type of message (or at least one of the types of message) preferably includes the steps of: extracting the frame number, or a component of it, from the detected message; and testing its value. In the case of a GSM network, and the last-mentioned type of message may be, for example, a CHAN RQD message.

Alternatively or additionally, the detected message (or at least one of the detected messages) may be one which includes an indication of a channel type on which the message is to be sent, or was received, across the radio interface, and in this case the extracting step for the type of message (or at least one of the types of message) preferably includes the steps of: extracting the channel type from the detected message; and testing its value. In the case of a GSM network, the last-mentioned type of message may be, for example, a CHAN ACTIV, EST REQ, SMSBREQ or SMSBC message.

As will be described in more detail below, with the above features, the extracted information can be used to determine whether the cell has Group iv, Group v or Group vi control channel configuration, as specified in GSM standard 05.02.

Alternatively or additionally, the detected message (or at least one of the detected messages) may be one which includes an indication of a paging group to which one of the mobile stations belongs, and in this case the extracting step for the type of message (or at least one of the types of message) preferably includes the steps of: extracting the paging group from the detected message; and keeping track of the highest paging group so extracted. In the case of a GSM network, the last-mentioned type of message may be a PAGING CMD message.

In accordance with a second aspect of the present invention, there is provided a corresponding apparatus for determining information about a cellular mobile radio network comprising a fixed part providing radio coverage in a plurality of cells and mobile stations for communicating with the fixed part across a radio interface, each cell using a group of control channels which are configured in accordance with configuration messages which are passed in the network when the cell is to be configured or reconfigured, the apparatus comprising: means for monitoring signalling messages of a cell which are passed in the network generally more frequently than the configuration messages; means for detecting one of the monitored messages which is of a first predetermined type; and means for extracting information from the detected message relating to the control channel group configuration of the cell.

A specific embodiment of the present invention will now be described, purely by way of example, with reference to the accompanying drawings, in which.

Figure 1:
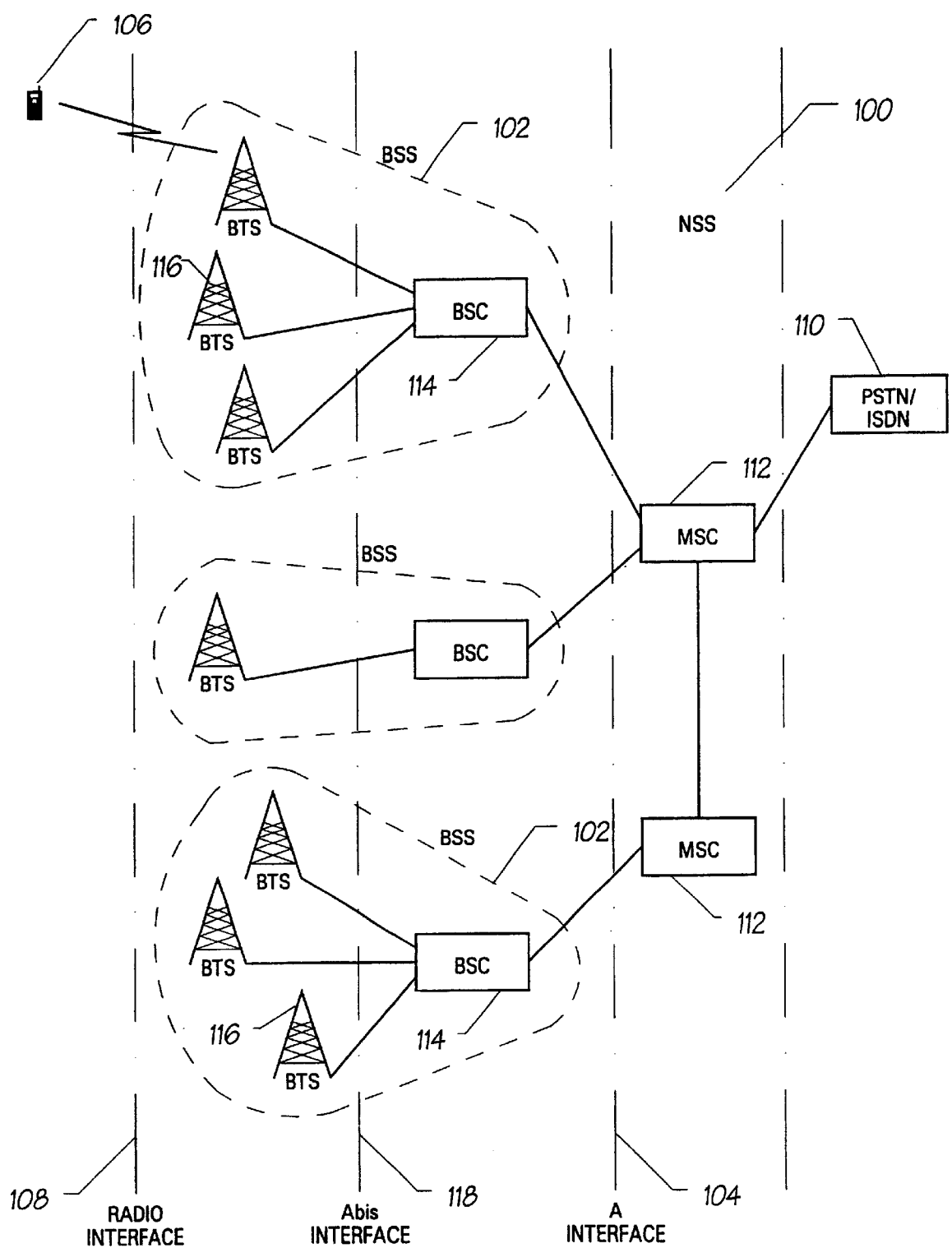
FIG. 1 is a schematic diagram of a GSM cellular mobile radio network.

Referring to FIG. 1, the illustrated GSM network comprises a Network and Switching Subsystem (NSS) 100, which connects with a plurality of Base Station Subsystems (BSS) 102 across an A interface 104. The BSSs 102 provide radio communication with mobile stations (MSs) 106 (only one of which is shown in FIG. 1) across a radio interface 108. The NSS 100 also communicates with the fixed public network 110, that is with the Public Switched Telephone Network (PSTN) and the Integrated Services Digital Network (ISDN). The NSS 100 comprises a number of Mobile Switching Centres (MSCs) 112 and other apparatus such as Home Location Registers and Visitor Location Registers. The MSCs 112 perform the function of switches, in a similar manner to PSTN switches, and also deal with the additional functionality required for mobile networks, such as registration, authentication location updating, international roaming and connection to the fixed public network 110.

Each BSS 102 comprises a Base Station Controller (BSC) 114 and a plurality of Base Transceiver Stations (BTSs) 116. Although not shown in FIG. 1, each BTS 116 comprises one or more elementary transceivers (TRXs) and at least one Base Controller Function (BCF). Each TRX can emit and receive radio signals across the radio interface 108 and provides radio coverage over a local area known as a cell. The number of TRXs per cell and the number of cells per BTS 116 is dependent upon the traffic capacity that the network operator wishes to cater for.

The radio interface 108 between an MS 106 and a BTS 116 is standardised within a GSM network. Similarly, the interface between each BTS 116 and its associated BSC 114, by which user data and signalling are exchanged, is also standardised, and is known as the Abis interface 118.

In GSM networks, user data and signalling are multiplexed across the radio interface 108, the Abis interface 118 and the A interface 104. Signalling within the NSS 100, over the A interface to the BSCs 114 and with the fixed public network 110, is effected through signalling links which utilise signalling schemes based on the SS7 Standard.

Digital mobile networks require exchange of control information between the MS 106 and the infrastructure 100, 102. Together with traffic channels (TCs), used for carrying user traffic, e.g. voice, control channels are also supported. Unlike traffic channels that have a dynamic lifecycle and are only allocated when needed, control channels have a more static lifecycle. In a GSM network they are assigned on a cell basis. Once configured, they are not subject to many changes, but their configuration can change as soon as it is required. In GSM, three parameters describe the configuration of control channels within a cell. They are:

CCCH_CONF the number and type of control channels supported in the cell;

BS_AG_BLKS_RES the portion of a control channel reserved for granting MS requests; and BS_PA_MFRMS the cycle in the utilisation portion of a control channel.

These three parameters and many others are continuously broadcast within the cell, in order to provide any MS 106 with the configuration information it requires to work properly in the network. A BSC 114 sends some of the configuration information to each of the BTSs 116 it manages through some messages expressly reserved for this task. Unfortunately these messages, belonging to the Abis interface 118 protocol, are sent only when a cell reconfiguration takes place, and this is not a very common event in the normal lifecycle of a digital mobile network.

The example of the invention is concerned with a technique which, by listening to signalling traffic on the Abis links 118 of a GSM network, provide the value of the CCCH_CONF parameter and the total number of paging groups. This value is linked to the product of BS_AG_BLKS_RES×BS_PA_MFRMS.

This technique relies on messages that very often appear on the Abis interface 118 as well as on those specific messages that carry explicitly configuration information, i.e SYStem INFOrmation messages.

The radio interface of GSM uses a combination of Time Division Multiple Access (TDMA) and Frequency Division Multiple Access (FDMA) and optionally Frequency Hopping. On the radio interface 108, the basic unit of transmission is called a burst and is constituted by about one hundred modulated bits. The term Burst Period (BP) is instead used to refer to the duration of a burst which is $15/26$ Ms.

A specific channel transmits bursts at specific instants in time and at specific frequencies, i.e. transmits bursts in specific slots. A number, called Timeslot Number (TN), is assigned to every slot, and this numbering is cyclic.

The description of a channel in the time domain consists of giving the numbers of the slots it uses. This slot sequence always follows a cyclic organisation, but the length of the cycle as well as the number of slots in a cycle varies according to the type of channel.

The term TDMA Frame Number (FN) is used is GSM and refers to a succession of eight consecutive TNs, numbered between 0 and 7. Since in GSM every channel must use the same TN, the temporal description of a channel is given in terms of FN. The numbering of FN follows a very long cycle of 2715647, about three and an half hours.

Several FN cycles are defined by the GSM standard and they are:

26 TDMA frame multiframe. This defines a succession of 26 TDMA frames and refers to the organisation of traffic channels. In this specification, it is referred to as 26_multiframe.

51 TDMA frame multiframe. This defines a succession of 51 TDMA frames and refers to the organisation of control channels. In this specification, it is referred to as 51_multiframe.

superframe. This consists of 26 consecutive 51_multiframe.

hyperframe. This consists of 2048 consecutive superframes.

The control channels and three categories of them are defined by the GSM standard as:

Broadcast Channel category. Broadcast channels are point-to-multipoint downlink channels, and they are used to support the MS 106 in idle mode, i.e. when no traffic channel is allocated. (The term downlink refers to the radio link in the direction from the network 100,102 to the MS 106.) Four channels belong to this category:

FCCH or Frequency Correction CHannel. This carries information to perform frequency correction of the MS 106.

SCH or Synchronisation CHannel. This provides the MS 106 with all the information needed for its initial synchronisation with the network 100,102. Only a single set of FCCH and SCH is broadcast in any cell, and it always takes the same position within a TDMA frame. Their position defines the so-called TN0. The frequency used to transmit this set is called the beacon frequency of the cell.

BCCH or Broadcast Control CHannels. These are intended for broadcasting general information to every MS 106 in idle mode on a per cell basis. This broadcasted information takes the name of SYStem INFOrmation. Several types of system information messages have been defined in the standard (type 1, 2, 2bis, 3, 4, 5, 5bis, 6, 7, 8), and they provide each MS 106 with information about parameters that are related to the specific cell where the MS 106 is camped. Some of this configuration information is: cell identifier, location area, configuration of controls channels, beacon frequency to monitor for cell re-selection and handover, and so on.

CBCH or Cell Broadcast CHannel. This is used to dispatch Short Message Service Cell Broadcast (SMSCB) meassages, i.e. short messages that are broadcast to all MSs 106 within a cell.

Common Channel category. Three channels belong to this category and they are mainly intended to provide support for access to the network 100,102. Unlike broadcast channels, common control channels are point-to-point and point-to-multipoint unidirectional channels. They comprise:

RACH or Random Access CHannel. This is a point-to-point uplink channel. (The term uplink refers to the radio link in the direction from the MS 106 to the network 100,102.) It allows any MS 106 to transmit its access request to the network 100,102. This access takes place in a random way and a mechanism is implemented to handle possible collisions among several MSs 106.

AGCH or Access Grant Channel. This is a point-to-multipoint downlink channel. It is used to send assignment messages to any MS 106. An assignment message provides the description of the channel allocated by the network once the MS 106 has requested an access to the network 100,102. At this time, there is not yet any dedicated connection between the MS 106 that requested the channel, and the network 100,102. Hence the description of the channel allocated to support the communication in dedicated mode has to be broadcast in the cell.

PCH or Paging Channel. This is a point-to-multipoint downlink channel. It is used by the network 100,102 to page one MS 106 in the case of mobile-terminating call.

Dedicated Channel category. Dedicated channels are always point-to-point bi-directional control channels, and they carry signalling related to a traffic channel or signalling related to network management. They comprise:

FACCH or Fast Associated Control CHannel. Its existence is linked with a TCH and it is obtained by a pre-emptive dynamic multiplexing on a TCH/F (full-rate traffic channel) or a TCH/H (half-rate traffic channel) in the case when urgent signalling is required to be exchanged between the MS 106 and the network 100,102, e.g. in the case of handover. Its bit rate is respectively 9.2 or 4.6 kbits/s.

SACCH or Slow Associated Control CHannel. This is always allocated together with a TCH or a SDCCH, and it carries signalling required for the management of the active connection, i.e. TCH or SDCCH. Its bit rate is respectively $^{115}/_{300}$ or $^{299}/_{765}$ kbits/s.

SDCCH or Stand-alone Dedicated Control CHannel. The allocation of an SDCCH is not linked with any TCH, and it is used when there is the need to establish a connection between a MS 106 and the network 100,102 only for signalling matters such as: short messages, location updating procedure, and so on. Its bit rate is $^{598}/_{765}$ kbits/s.

Traffic and control channels can be grouped together in a cell, but only a few combinations are allowed. In particular, allowed groups are:

i) TCH/F+FACCH/F+SACCH/TF, where FACCH/F and SACCH/TF are the FACCH and SACCH associated with that full-rate traffic channel;

ii) TCH/H(0,1)+FACCH/(0,1)+SACCH/TH(0,1), where FACCH/(0,1) and SACCH/TH(0,1) are the FACCH and SACCH associated with that half-rate traffic channel and having the same sub-timeslot 0 or 1;

iii) TCH/H(0,0)+FACCH/(0,1)+SACCH/TH(0,1)+TCH/H(1,1);

iv) FCCH+SCH+BCCH+CCCH, where CCCH (Control Common CHannel)=PCH+RACH+AGCH;

v) FCCH+SCH+BCCH+CCCH+SDCCH/4(0 . . . 3)+SACCH/C4(0 . . . 3), where the SDCCH has one of four possible sub-timeslots and the SACCH uses the same timeslot;

vi) BCCH+CCCH; and vii) SDCCH/8(0 . . . 7)+SACCH/C8(0 . . . 7).

The GSM standard also imposes constraints about timeslots and frequencies that could be used to support each of the allowed combinations of channels. Further constraints are also imposed on the number and type of groups of channel combinations that can be supported in a cell.

Unlike traffic channels that are allocated only when needed, control channels, with the exception of SDCCH, are permanently allocated and, within a cell, their configuration changes only when a cell reconfiguration takes place.

The present description focusses only on the autodiscovery of those channel combinations that belong to Groups iv, v, and vi. The determination of other groups is straightforward, because they can be easily detected by the channel and link allocation messages, e.g. CHANnel ACTIVation, on the Abis interface 118.

Constraints about control channel configurations and their combinations can be summarised in the following statements:

Groups iv, v, vi are only allowed on those TRXs that transmit the beacon frequency;

Group iv and v can only be supported on TN0;

Group v can only be supported if no other CCCHs are allocated, i.e. Group vi;

Group vi, also called extended set, can only be supported on TN2, TN4, and TN6.

No more that three extended sets can be supported in a cell; if SMSCB is supported, the CBCH replaces the SDCCH sub channel 2 in Group v and vii.

The choice of Group iv or v for the configuration of control channels is related to the traffic capacity the cell is intended to support. As described in more detailed below, Group v is only suitable for cells with low traffic capacity because its CCCH is limited in size, hence it cannot support high rate of access request or pagings.

Group iv instead is suitable for medium capacity cells. In the case of high capacity cells, extended sets, Group vi, are also added to the basic configuration, i.e. Group iv, in order to support the higher rate of access requests and pagings. Its own BCCH is required for every extended set, at least for two reasons: 1) part of the information broadcast by the BCCH relates to the RACH on the same TN; and 2) it is simpler for the MS 106 to listen to bursts of a single TN only.

Only a few parameters are used to describe the configuration of common control channels in a cell. These parameters are broadcast on the BCCH by sending system information messages of types 1, 3, and 4 mentioned above.

The parameters which describe the configuration of control channels within a cell are the following:

CCCH_CONF indicates the organisation of common control channels. It also defines two other values:
- BS_CC_CHANS, which is the number of CCCHs employed in the cell; and
- BS_CCCH_SDCCH_COMB which indicates whether or not CCCH or SDCCH are combined, i.e. Group v is employed. Table 1 shows all the possible combinations and their related values.

TABLE 1

Permissible Control Channel Combinations

| CCCH_CONF | BS_CC_CHANS | BS_CCCH_SDCCH_COMB | Channel Combinations |
|---|---|---|---|
| 000 | 1 | False | Group iv |
| 001 | 1 | True | Group v |
| 010 | 2 | False | Group iv + one Group vi |
| 100 | 3 | False | Group iv + two Group vi |
| 110 | 4 | False | Group iv + three Group vi |

BS_AG_BLKS_RES indicates the number of blocks on each CCCH reserved for the AGCH. Three bits are used, and the value can range between 0 to 7.

BS_PA_MFRMS indicates the number of 51_multiframe between transmission of paging messages to MSs of the same paging group, i.e. cyclicity in the PCH. Three bits are used to indicate a value in the range between 2 to 9.

The paging procedure has been designed to allow the network to notify a specific MS 106 that an incoming call must reach it. Complexity of scheduling paging messages has been introduced mainly to increasing significantly the life time of the MS's battery, at the expense of a small increase in delay for setting up an incoming call.

In particular, the technique implemented in GSM is know as discontinuous reception. It allows the MS 106 to power down a large part of its circuitry for a high percentage of time when the MS 106 is in idle mode.

Such a scheme, is achieved by allowing every MS 106 to restrict its monitoring of paging messages to only a specific time interval. In order to realise this, MSs 106 are divided in groups, called paging groups. The group an MS 106 belongs to is known both to the MS 106 and the network 100,102 and the value is determined by the IMSI, BS_AG_BLKS_RES and BS_PA_MFRMS parameters (or knowledge of the CCCH channels). Actually, two values are needed: CCCH_GROUP and PAGING_GROUP. The first one defines to which CCCH, i.e. TN, the MS 106 must listen for the PCH. The second value defines to which specific block within a PCH the MS 106 must actually listen for a possible paging message.

A PCH may also support a number of paging groups, or paging sub-channels, bigger than the number of blocks reserved for paging on the CCCH. This is achieved by using the blocks of a PCH in a cyclic way. Therefore, the total number of paging groups supported by a PCH is given by the product BS_AG_BLKS_RES×BS_PA_MFRMS. In the case that more than one PCH is supported in a cell, all the PCHs have the same structure and therefore the same number of paging sub-channels.

System information messages are provided to the BTS 116 by the BSC 114 by sending BCCH INFOrmation messages (GSM TS 08.58, 8.5.1), SACCH FILLing messages (GSM TS 08.58, 8.6.2), and eventually SACCH INFO MODIFY messages (GSM TS 08.58, 8.4.20). Unfortunately, in some networks, these messages, especially those carrying system information type 1, 3, and 4, are sent by the BSC 114 only when a cell reconfiguration takes place. In other networks, they may occasionally be sent at other times. Nevertheless, one cannot, in practice, rely on these messages being available to determine CCCH_CONF, BS_AG_BLKS_RES and BS_PA_MFRMS.

However, it has been realised that messages frequently sent over the Abis interface 118 could be successfully used to provide some knowledge about the configuration of CCCH, and a technique has been developed to determine the CCCH_CONF value and consequently BS_CC_CHANS and BS_CCCH_SDCCH_COMB. Although this technique does not determine the BS_AG_BLKS_RES and BS_PA_MFRMS parameters, it can be possible to determine the total number of paging groups supported in the cell.

Before describing the technique, a detailed description, in terms of TDMA frames, of the channel configuration in the case of Groups iv, v, and vi is given with reference to Tables 2 to 4, which are all based on 51_multiframes with frames numbered from 0 to 50.

Group iv

This specific combination of control channels is shown in Table 2. It is based on a single 51_multiframe and it can be only implemented on TN0. The downlink contains the FCCH, SCH, BCCH, PCH, and AGCH. Apart from FCCH and SCH, the rest of the 51_multiframe is organised in blocks, i.e. consecutive groups of four TDMA frames. Only one block is reserved for the BCCH; the other nine blocks are reserved for PCH and AGCH. The uplink is instead completely reserved for the RACH.

TABLE 2

Group iv

| Downlink: FCCH + SCH + BCCH + CCCH | | Uplink: RACH | |
|---|---|---|---|
| FN | Channel | FN | Channel |
| 0 | FCCH | 0 | RACH |
| 1 | SCH | 1 | RACH |
| 2 | BCCH | 2 | RACH |
| 3 | BCCH | 3 | RACH |
| 4 | BCCH | 4 | RACH |
| 5 | BCCH | 5 | RACH |
| 6 | CCCH | 6 | RACH |
| 7 | CCCH | 7 | RACH |
| 8 | CCCH | 8 | RACH |
| 9 | CCCH | 9 | RACH |
| 10 | FCCH | 10 | RACH |
| 11 | SCH | 11 | RACH |
| 12 | CCCH | 12 | RACH |
| 13 | CCCH | 13 | RACH |
| 14 | CCCH | 14 | RACH |
| 15 | CCCH | 15 | RACH |
| 16 | CCCH | 16 | RACH |
| 17 | CCCH | 17 | RACH |
| 18 | CCCH | 18 | RACH |
| 19 | CCCH | 19 | RACH |
| 20 | FCCH | 20 | RACH |
| 21 | SCH | 21 | RACH |
| 22 | CCCH | 22 | RACH |
| 23 | CCCH | 23 | RACH |
| 24 | CCCH | 24 | RACH |
| 25 | CCCH | 25 | RACH |

TABLE 2-continued

Group iv

| Downlink: FCCH + SCH + BCCH + CCCH | | Uplink: RACH | |
|---|---|---|---|
| FN | Channel | FN | Channel |
| 26 | CCCH | 26 | RACH |
| 27 | CCCH | 27 | RACH |
| 28 | CCCH | 28 | RACH |
| 29 | CCCH | 29 | RACH |
| 30 | FCCH | 30 | RACH |
| 31 | SCH | 31 | RACH |
| 32 | CCCH | 32 | RACH |
| 33 | CCCH | 33 | RACH |
| 34 | CCCH | 34 | RACH |
| 35 | CCCH | 35 | RACH |
| 36 | CCCH | 36 | RACH |
| 37 | CCCH | 37 | RACH |
| 38 | CCCH | 38 | RACH |
| 39 | CCCH | 39 | RACH |
| 40 | FCCH | 40 | RACH |
| 41 | SCH | 41 | RACH |
| 42 | CCCH | 42 | RACH |
| 43 | CCCH | 43 | RACH |
| 44 | CCCH | 44 | RACH |
| 45 | CCCH | 45 | RACH |
| 46 | CCCH | 46 | RACH |
| 47 | CCCH | 47 | RACH |
| 48 | CCCH | 48 | RACH |
| 49 | CCCH | 49 | RACH |
| 50 | IDLE | 50 | RACH |

Group v

The organisation of this group is based on one 51_multiframe insofar as it concerns FCCH, SCH, BCCH, CCCH, and RACH, but on two consecutive 51_multiframes insofar as it concerns the four SDCCHs, as shown in Table 3. The downlink contains FCCH and SCH, one block for BCCH and three blocks reserved for PCH and AGCH. The other six available blocks, in each 51_multiframe, are reserved for SDCCHs and their related SACCHs. The uplink reserves six blocks, in each 51_multiframe, for SDCCHs and all the other TDMA frames for the RACH.

TABLE 3

Group v

| Downlink: FCCH + SCH + BCCH + CCCH + SDCCH/4(0 ... 3) + SACCH/C4(0 ... 3) | | | | Uplink: RACH + SDCCH/4(0 ... 3) + SACCH/C4(0 ... 3) | | | |
|---|---|---|---|---|---|---|---|
| FN | Channel | FN | Channel | FN | Channel | FN | Channel |
| 0 | FCCH | 51 | FCCH | 0 | SDCCH/4(3) | 51 | SDCCH/4(3) |
| 1 | SCH | 52 | SCH | 1 | SDCCH/4(3) | 52 | SDCCH/4(3) |
| 2 | BCCH | 53 | BCCH | 2 | SDCCH/4(3) | 53 | SDCCH/4(3) |
| 3 | BCCH | 54 | BCCH | 3 | SDCCH/4(3) | 54 | SDCCH/4(3) |
| 4 | BCCH | 55 | BCCH | 4 | RACH | 55 | RACH |
| 5 | BCCH | 56 | BCCH | 5 | RACH | 56 | RACH |
| 6 | CCCH | 57 | CCCH | 6 | SACCH/C4(2) | 57 | SACCH/C4(0) |
| 7 | CCCH | 58 | CCCH | 7 | SACCH/C4(2) | 58 | SACCH/C4(0) |
| 8 | CCCH | 59 | CCCH | 8 | SACCH/C4(2) | 59 | SACCH/C4(0) |
| 9 | CCCH | 60 | CCCH | 9 | SACCH/C4(2) | 60 | SACCH/C4(0) |
| 10 | FCCH | 61 | FCCH | 10 | SACCH/C4(3) | 61 | SACCH/C4(1) |
| 11 | SCH | 62 | SCH | 11 | SACCH/C4(3) | 62 | SACCH/C4(1) |
| 12 | CCCH | 63 | CCCH | 12 | SACCH/C4(3) | 63 | SACCH/C4(1) |
| 13 | CCCH | 64 | CCCH | 13 | SACCH/C4(3) | 64 | SACCH/C4(1) |
| 14 | CCCH | 65 | CCCH | 14 | RACH | 65 | RACH |
| 15 | CCCH | 66 | CCCH | 15 | RACH | 66 | RACH |
| 16 | CCCH | 67 | CCCH | 16 | RACH | 67 | RACH |
| 17 | CCCH | 68 | CCCH | 17 | RACH | 68 | RACH |
| 18 | CCCH | 69 | CCCH | 18 | RACH | 69 | RACH |
| 19 | CCCH | 70 | CCCH | 19 | RACH | 70 | RACH |
| 20 | FCCH | 71 | FCCH | 20 | RACH | 71 | RACH |
| 21 | SCH | 72 | SCH | 21 | RACH | 72 | RACH |
| 22 | SDCCH/4(0) | 73 | SDCCH/4(0) | 22 | RACH | 73 | RACH |
| 23 | SDCCH/4(0) | 74 | SDCCH/4(0) | 23 | RACH | 74 | RACH |
| 24 | SDCCH/4(0) | 75 | SDCCH/4(0) | 24 | RACH | 75 | RACH |
| 25 | SDCCH/4(0) | 76 | SDCCH/4(0) | 25 | RACH | 76 | RACH |
| 26 | SDCCH/4(1) | 77 | SDCCH/4(1) | 26 | RACH | 77 | RACH |
| 27 | SDCCH/4(1) | 78 | SDCCH/4(1) | 27 | RACH | 78 | RACH |
| 28 | SDCCH/4(1) | 79 | SDCCH/4(1) | 28 | RACH | 79 | RACH |
| 29 | SDCCH/4(1) | 80 | SDCCH/4(1) | 29 | RACH | 80 | RACH |
| 30 | FCCH | 81 | FCCH | 30 | RACH | 81 | RACH |
| 31 | SCH | 82 | SCH | 31 | RACH | 82 | RACH |
| 32 | SDCCH/4(2) | 83 | SDCCH/4(2) | 32 | RACH | 83 | RACH |
| 33 | SDCCH/4(2) | 84 | SDCCH/4(2) | 33 | RACH | 84 | RACH |

TABLE 3-continued

Group v

| | Downlink:<br>FCCH + SCH + BCCH + CCCH +<br>SDCCH/4(0 . . . 3) + SACCH/C4(0 . . . 3) | | | | Uplink: RACH +<br>SDCCH/4(0 . . . 3) + SACCH/C4(0 . . . 3) | | |
|---|---|---|---|---|---|---|---|
| FN | Channel | FN | Channel | FN | Channel | FN | Channel |
| 34 | SDCCH/4(2) | 85 | SDCCH/4(2) | 34 | RACH | 85 | RACH |
| 35 | SDCCH/4(2) | 86 | SDCCH/4(2) | 35 | RACH | 86 | RACH |
| 36 | SDCCH/4(3) | 87 | SDCCH/4(3) | 36 | RACH | 87 | RACH |
| 37 | SDCCH/4(3) | 88 | SDCCH/4(3) | 37 | SDCCH/4(0) | 88 | SDCCH/4(0) |
| 38 | SDCCH/4(3) | 89 | SDCCH/4(3) | 38 | SDCCH/4(0) | 89 | SDCCH/4(0) |
| 39 | SDCCH/4(3) | 90 | SDCCH/4(3) | 39 | SDCCH/4(0) | 90 | SDCCH/4(0) |
| 40 | FCCH | 91 | FCCH | 40 | SDCCH/4(0) | 91 | SDCCH/4(0) |
| 41 | SCH | 92 | SCH | 41 | SDCCH/4(1) | 92 | SDCCH/4(1) |
| 42 | SACCH/C4(0) | 93 | SACCH/C4(2) | 42 | SDCCH/4(1) | 93 | SDCCH/4(1) |
| 43 | SACCH/C4(0) | 94 | SACCH/C4(2) | 43 | SDCCH/4(1) | 94 | SDCCH/4(1) |
| 44 | SACCH/C4(0) | 95 | SACCH/C4(2) | 44 | SDCCH/4(1) | 95 | SDCCH/4(1) |
| 45 | SACCH/C4(0) | 96 | SACCH/C4(2) | 45 | RACH | 96 | RACH |
| 46 | SACCH/C4(1) | 97 | SACCH/C4(3) | 46 | RACH | 97 | RACH |
| 47 | SACCH/C4(1) | 98 | SACCH/C4(3) | 47 | SDCCH/4(2) | 98 | SDCCH/4(2) |
| 48 | SACCH/C4(1) | 99 | SACCH/C4(3) | 48 | SDCCH/4(2) | 99 | SDCCH/4(2) |
| 49 | SACCH/C4(1) | 100 | SACCH/C4(3) | 49 | SDCCH/4(2) | 100 | SDCCH/4(2) |
| 50 | IDLE | 101 | IDLE | 50 | SDCCH/4(2) | 101 | SDCCH/4(2) |

Group vi

This channel combination is similar to the one described in Group iv and it is only used in combination with Group iv in the case of high traffic cells, to increase the capacity of control channels. This extended set can only be supported on TN2, TN4, and TN6. As shown in Table 4, the downlink is only used by the BCCH, one block, and PCH and AGCH, sharing nine blocks. The uplink is completely reserved for the RACH.

TABLE 4

| Downlink:<br>BCCH + CCCH | | Uplink:<br>RACH | |
|---|---|---|---|
| FN | Channel | FN | Channel |
| 0 | IDLE | 0 | RACH |
| 1 | IDLE | 1 | RACH |
| 2 | BCCH | 2 | RACH |
| 3 | BCCH | 3 | RACH |
| 4 | BCCH | 4 | RACH |
| 5 | BCCH | 5 | RACH |
| 6 | CCCH | 6 | RACH |
| 7 | CCCH | 7 | RACH |
| 8 | CCCH | 8 | RACH |
| 9 | CCCH | 9 | RACH |
| 10 | IDLE | 10 | RACH |
| 11 | IDLE | 11 | RACH |
| 12 | CCCH | 12 | RACH |
| 13 | CCCH | 13 | RACH |
| 14 | CCCH | 14 | RACH |
| 15 | CCCH | 15 | RACH |
| 16 | CCCH | 16 | RACH |
| 17 | CCCH | 17 | RACH |
| 18 | CCCH | 18 | RACH |
| 19 | CCCH | 19 | RACH |
| 20 | IDLE | 20 | RACH |
| 21 | IDLE | 21 | RACH |
| 22 | CCCH | 22 | RACH |
| 23 | CCCH | 23 | RACH |
| 24 | CCCH | 24 | RACH |
| 25 | CCCH | 25 | RACH |
| 26 | CCCH | 26 | RACH |
| 27 | CCCH | 27 | RACH |
| 28 | CCCH | 28 | RACH |
| 29 | CCCH | 29 | RACH |
| 30 | IDLE | 30 | RACH |

TABLE 4-continued

| Downlink:<br>BCCH + CCCH | | Uplink:<br>RACH | |
|---|---|---|---|
| FN | Channel | FN | Channel |
| 31 | IDLE | 31 | RACH |
| 32 | CCCH | 32 | RACH |
| 33 | CCCH | 33 | RACH |
| 34 | CCCH | 34 | RACH |
| 35 | CCCH | 35 | RACH |
| 36 | CCCH | 36 | RACH |
| 37 | CCCH | 37 | RACH |
| 38 | CCCH | 38 | RACH |
| 39 | CCCH | 39 | RACH |
| 40 | IDLE | 40 | RACH |
| 41 | IDLE | 41 | RACH |
| 42 | CCCH | 42 | RACH |
| 43 | CCCH | 43 | RACH |
| 44 | CCCH | 44 | RACH |
| 45 | CCCH | 45 | RACH |
| 46 | CCCH | 46 | RACH |
| 47 | CCCH | 47 | RACH |
| 48 | CCCH | 48 | RACH |
| 49 | CCCH | 49 | RACH |
| 50 | IDLE | 50 | RACH |

CBCH Support

If CBCH is supported, the Group v and Group vii channel combinations are modified as follows. CBCH uses the same physical channel as an SDCCH on sub-channel 2, but only downlink slots. CBCH can be supported on TN0 if Group v is implemented, or on TN0, TN1, TN2, TN3 if they support Group vii. CBCH follows an eight 51_multiframe cycle, and only four slots, in the downlink direction, are used. The related uplink and SACCH slots are not used by anything else. However, in case of congestion, the transmission of the CBCH can be stopped, and its resources can then be used by a normal SDCCH.

As mentioned above, the BCCH INFO, SACCH FILL and SACCH INFO MODIFY messages carry explicitly all the information required to determine the configuration of control channels within a cell. Unfortunately, these messages are sent only when a cell reconfiguration takes place and this is almost a rare event. Therefore, an autodiscovery technique cannot rely only on these messages. Extra messages, on the Abis interface 118, have been identified as useful to build some knowledge of the configuration of control channels within a cell. The main advantage in also using these messages is that they are sent frequently on the Abis interface 118. Hence an autodiscovery technique can provide results quickly.

In particular, the CHANnel ReQuiRed (GSM TS 08.58, 8.5.3) and PAGING CoMmanD (GSM TS 08.58, 8.5.5) messages are used to determine which TN supports a Group iv or Group vi channel combination. CHANnel ACTIVation (GSM TS 08.58, 8.4.1) and ESTablish REQuest (GSM TS 08.58, 8.3.4), for example, may be used instead to determine if TN0 supports Group v. The PAGING CoMmanD also provides information about the total number of paging groups in the cell. Finally, the SMS BroadCast REQuest (GSM TS 08.58, 8.5.7) and SMS BroadCast Command (GSM TS 08.58, 8.5.8) are used to detect the CBCH and eventually a Group v.

All of these messages carry the Channel Number element identifier (GSM TS 08.58, 9.3.1). This indicates on which physical channel/sub-channel and TN the message is to be sent (if in the direction BSC 114 to BTS 116), or was received (if in the direction BTS 116 to BSC 114). Only seven types of channels are coded in this element:
TCH/F+ACCH,
TCH/H+ACCH,
SDCCH/4+ACCH,
SDCCH/8+ACCH,
BCCH,
Uplink CCCH (RACH),
Downlink CCCH (PCH+AGC).
Use of the CHAN RQD Message The CHAN RQD message is sent from the BTS 116 to the BSC 114 to indicate that an MS 106 has requested the allocation of a channel. Together with the Channel Number, the Request Reference (GSM TS 08.58, 9.3.19) element identifier is also carried. This element is composed of two values: the Random Access Information and the Absolute Frame Number modulo 42432. The latter is related to the absolute frame number when the access burst was received by the RACH. This value is decomposed into three values and the only one important for this autodiscovery strategy is the T3 value, which provides the frame number modulo 51, i.e. the frame number within a 51_multiframe.

Figure 2:
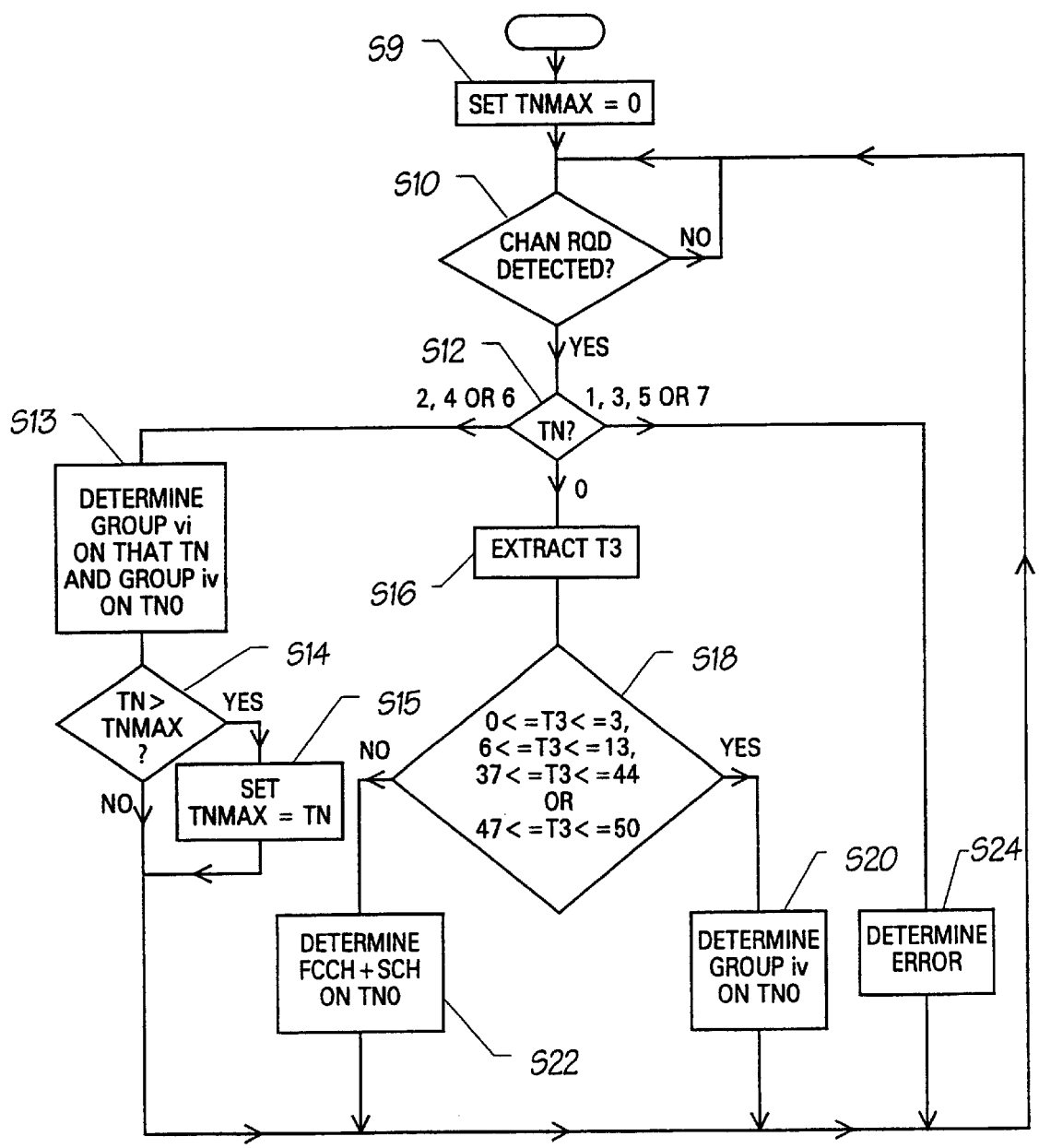
FIGS. 2 to 5 are flow diagrams of the processing of various detected messages, being examples of the method of the invention.

The method used is shown in FIG. 2. In step S9, a value TNMAX is set to zero. Then, once a CHAN RQD message is detected in step S10, the TN is extracted from the Channel Number element and tested in step S12. A value of TN equal to 2, 4 or 6 means that the specific TN is currently supporting an extended set, i.e. Group vi, as determined in step S13. Indirectly this knowledge allows one to know that TN0 is supporting Group iv; in fact one or more extended sets can be supported if and only if the TN0 supports a channel combination as Group iv. In step S14 and S15, if the specific TN is less than the value of TNMAX, then the value of TNMAX is set equal to the value of that TN in order to determine the highest found value of TN. The mobile stations 106 are evenly distributed over those of the TNs which are implemented, and therefore the determination of TNMAX should not take very long.

If the CHAN RQD message refers to TN0, the T3 value of the Request Reference element is extracted in step S16 and examined in step S18. If T3 assumes a value which is specific to the case, the CCCH uplink is completely reserved for the RACH (see FIGS. 1 and 2), the TN cannot support Group v, and therefore it supports iv, as determined in step S20.

This concept can be better explained using an example. If T3 assumes the value 8, this means that the CHAN REQ messages has been received on the ninth TDMA frame of a 51_multiframe. By looking at Tables 2 and 3, it is clear that in Group v this position is reserved to a SDCCH/C4 and therefore a CHAN REQ message cannot be received. Therefore the TN is supporting a Group iv configuration.

Otherwise, if T3 assumes a value that is allowed both by Group iv and v (e.g. 5), it is only possible to say the TN0 supports the only set of FCCH and SCH of the cell, as determined in step S22.

Figure 3:
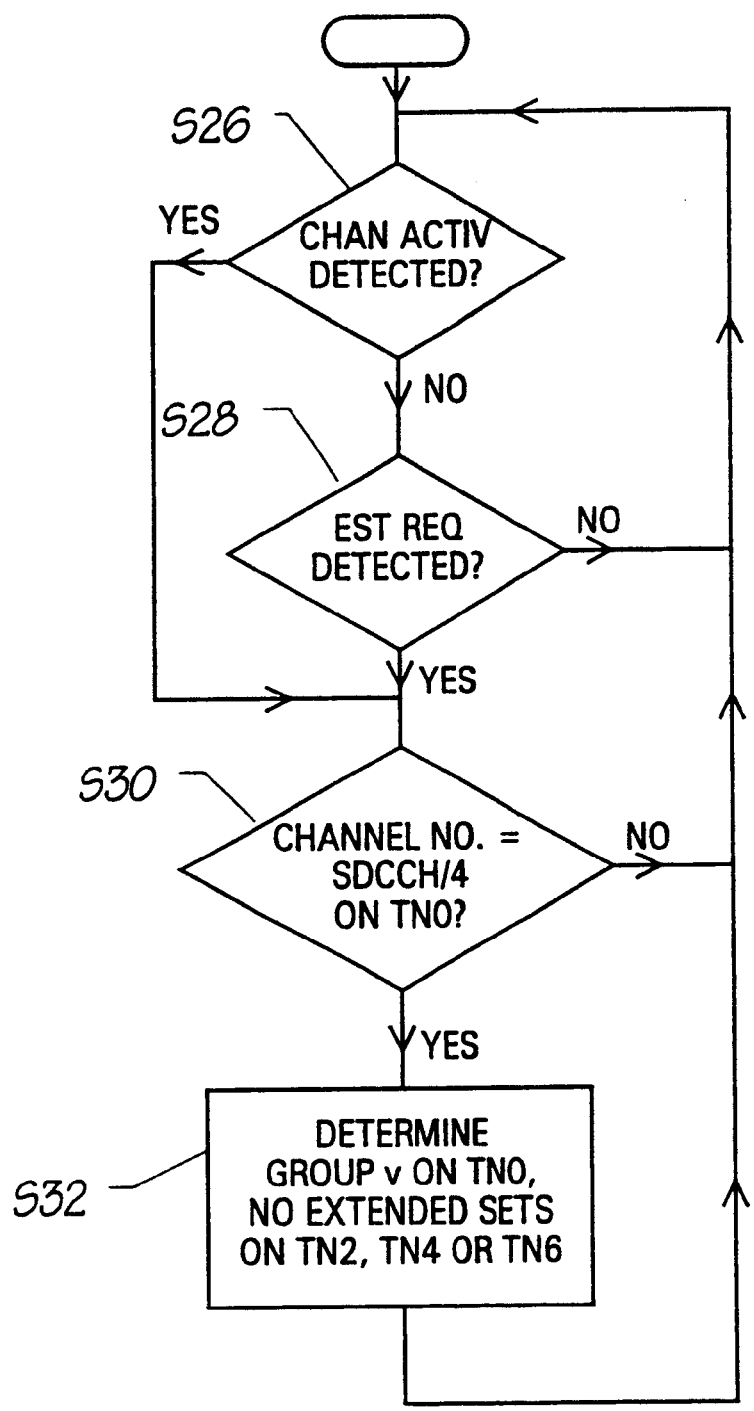

If a CHAN RQD message is received with a TN value set to 1, 3, 5, or 7 an erroneous situation has occurred since odd TNs cannot support RACH, as determined in step S24.
Use of the CHAN ACTIV and EST REQ Messages The CHAN ACTIV and EST REQ message can be used to determine a Group v configuration on TN0. Other messages may also be used. FIG. 3 shows the method used. Upon receiving one of these messages in step S26 or step S28, the TN value is extracted from the Channel Number. Only messages related to TN0 are interesting since Group v can only be supported by TN0.

If it is determined in step S30 that the Channel Number element refers to an SDCCH/4 on TN0, this means that TN0 is currently supporting a channel configuration as stated in Group v, as determined in step S32. This also means that no extended sets are supported.
Use of the PAGING CMD Message The PAGING CMD message can be used to provide two results: 1) determine if a Group vi is supported, and 2) estimate the total number of paging groups.

Figure 4:
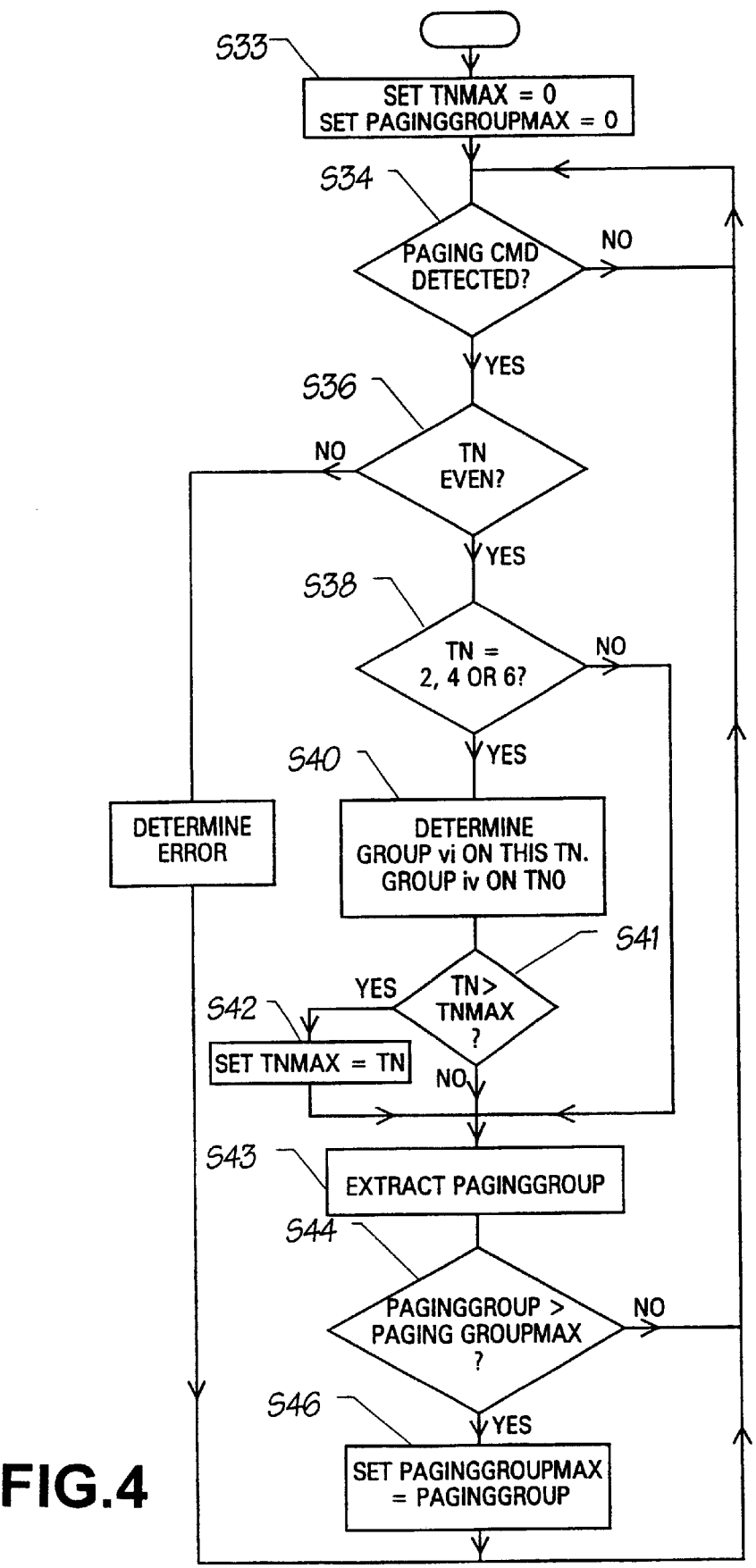

Referring to FIG. 4, the values TNMAX and PAGING-GROUPMAX are initially set to zero in step S33. Then, once a PAGING CMD message is detected in step S34, it is determined in steps S36 and S38 if it is sent on TN 2, 4, or 6. If so, it is determined in step S40 that the related TN supports an extended set, i.e. Group vi. It also implies that Group iv is supported by TN0. In fact the GSM standard allows one or more extended sets only if Group iv is supported on TN0. In steps S41, S42, the value of TNMAX is increased, if appropriate, in a similar manner to that described with reference to FIG. 2.

The total number of paging groups can be evaluated by extracting in step S43 the Paging Group element (GSM TS 08.58, 9.3.14) carried by the PAGING CMD message. The paging group element indicates to which paging population the MS to be paged belongs to. By comparing this value in step S44 with the maximum value currently detected, and updating the maximum value as appropriate in step S46, it is possible to evaluate the total number of paging groups in that cell.

Since all extended sets are configured in the same way, the number of paging groups is the same for every supported CCCH. This implies that the Paging Group element can be evaluated regardless of the TN on which the PAGING CMD has been detected.

Unfortunately, the PAGING CMD does not carry any information related to the frame number to which the paging message is going to be sent on the radio interface 108, so that it is not possible to get information about the numbers of blocks reserved only for paging on the CCCH downlink.

The knowledge of the total number of paging groups allows one to determine something elated to the product BS_AG_BLKS_RES×BS_PA_MFRMS, since the following relation exists:

$$\text{paging groups} = (DOWN\_CCCH - BS\_AG\_BLKS\_RES) \times BS\_PA\_MFRMS$$

where DOWN_CCCH is the total number of blocks reserved for the downlink CCCH. This number depends on the type of configuration chosen, and it is respectively 9 and 3 for Groups iv and v.

Use of SMSBREQ and SMSBC Messages

The SMSBREQ and SMSBC messages determine the existence of a CBCH. They can also be used to determine the existence of a Group v channel configuration on TN0.

The GSM standard imposes a few constraints to the allocation of the CBCH. It can use an SDCCH/4 on TN0 if this supports Group v. Otherwise it can use an SDCCH/8 on TN0, TN1, TN2, TN3, if they are configured as Group vii.

Figure 5:
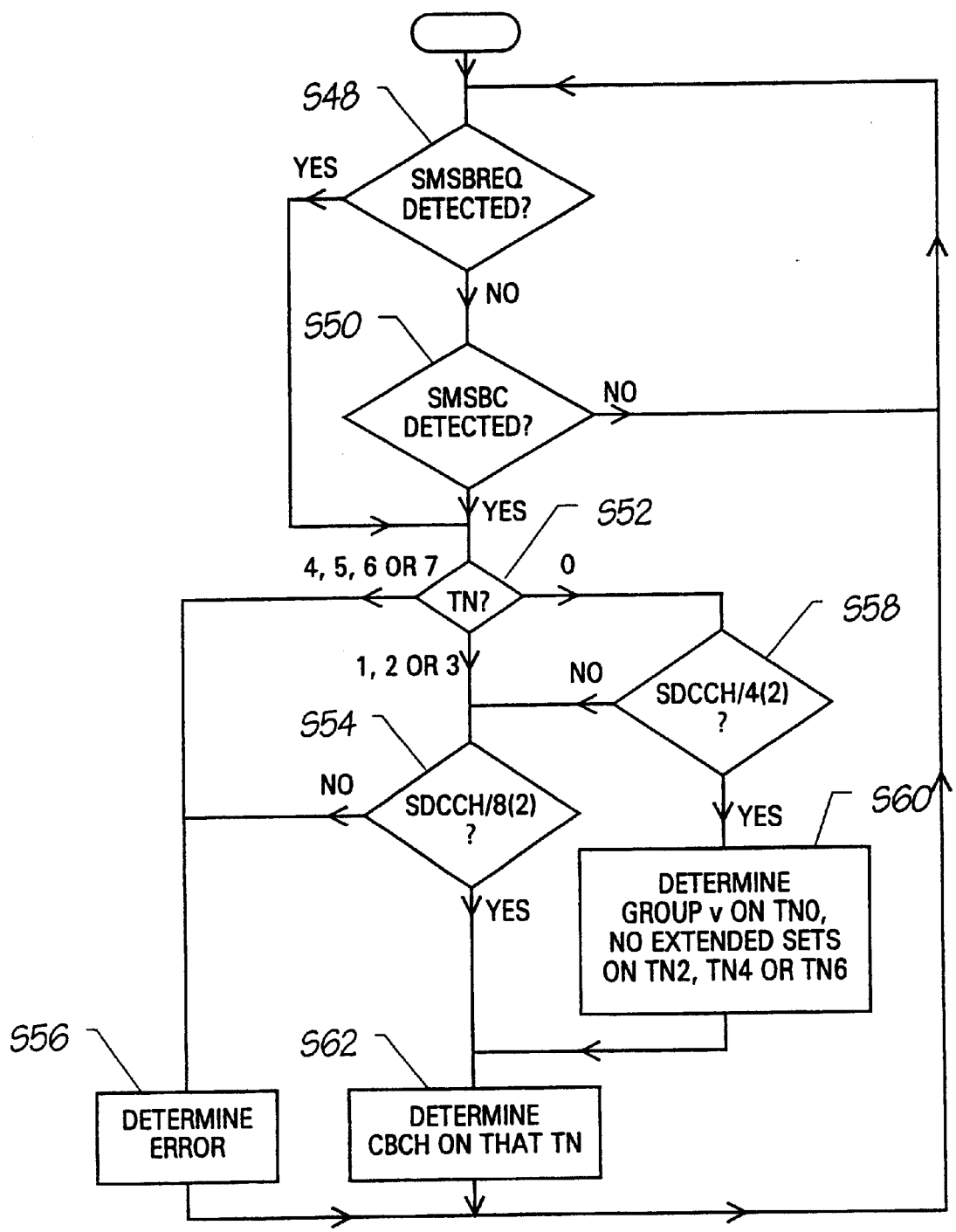

The allocation of a CBCH on TN0, using a SDCCH/8 can only happen if at least two TRXs are deployed in the cell, and in this case the CBCH is allocated on that TRX which does not support FCCH and SCH on its TN0. The method used is shown in FIG. 5.

Upon detecting an SMSBREQ or SMSBC message in step S48 or S50, the TN value is tested in step S52. If it is between 1 and 3, the channel type is checked in step S54. If it is not SDCCH/8 sub-channel 2, an erroneous condition is determined in step S56. An error has also occurred if the TN value is bigger than 3 as tested in step S52.

It the TN is equal to zero, and the channel type is an SDCCH/4 sub-channel 2 as tested in step S58, this means that TN0 is also supporting a Group v channel configuration and consequently any extended set, i.e. Group vi, is not supported, as determined in step S60. Also, if it is determined in step S60 that the channel type is SDCCH/4(2) or in step S54 that the channel type is SDCCH/8(2), then in step S62 it is determined that a CBCH is allocated on the current TN.

Figure 6:
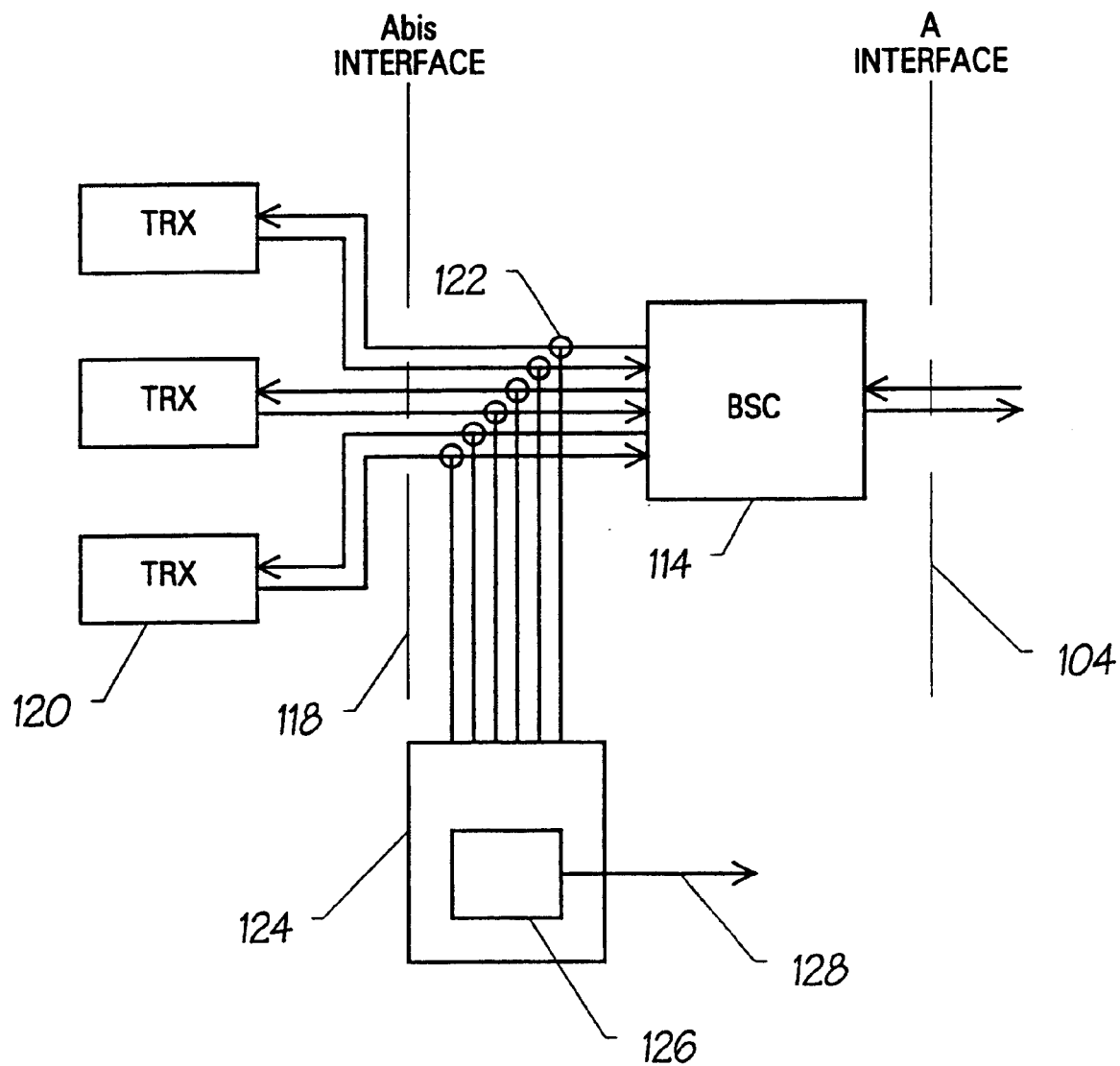
FIG. 6 is a block diagram of an embodiment of an apparatus in accordance with the invention.

Having described examples of the method, an apparatus for performing the method will now be described with reference to FIG. 6. The apparatus includes probes 122 attached to test points on the Abis interface 118 at the site of a BSC 114 between the BSC 114 and its TRXs 120. The apparatus further includes an HP E4251A Cardcage 124 available from Hewlett-Packard Limited and an analyser 126, such as a Hewlett-Packard HP9000 series 800 Unix server, for analysing and correlating the data monitored by the probes 122 in the manner described above with reference to FIGS. 2 to 5. A communications link 128 is provided from the analyser 126 so that the results of the autodiscovery techniques may be accessed from a remote location. Alternative equipment may be used.

Having described a specific embodiment of the invention and examples of its operation, it will be appreciated that many modifications and developments they be made thereto.

What is claimed is:

1. A method of determining information about a cellular mobile radio network comprising a fixed part providing radio coverage in a plurality of cells and mobile stations for communicating with the fixed part across a radio interface, each cell having a control channel group configuration that has one or more groups of control channel combinations and that is configured in accordance with configuration messages which are passed in the network when the cell is to be configured or reconfigured, the method comprising the steps of:
   monitoring signalling messages of a cell which are passed in the network generally more frequently than the configuration messages;
   detecting one of the monitored messages which is of a first predetermined type; and
   extracting information from the detected message relating to the control channel group configuration of the monitored cell.

2. A method as claimed in claim 1, wherein the first type of message contains information sufficient to determine some of the control channel group configuration information, but which is insufficient to determine the control channel group information for all of the control channel groups, and further including the steps of:
   detecting at least one other of the monitored messages which is of another predetermined type; and
   extracting further information from the other detected message relating to the control channel group configuration of the cell.

3. A method as claimed in claim 1, wherein the radio interface employs time division multiple access.

4. A method as claimed in claim 3, wherein the detected message (or at least one of the detected messages) includes an indication of a timeslot number for a timeslot in which the message is to be sent, or was received, across the radio interface, and wherein the extracting step for the type of message (or at least one of the types of message) includes the steps of:
   extracting the timeslot number from the detected message; and
   testing its value.

5. A method as claimed in claim 4, wherein the network is a GSM network, and the last-mentioned type of message is a CHAN RQD, CHAN ACTIV, EST REQ, PAGING CMD, SMSBREQ or SMSBC message.

6. A method as claimed in claim 3, wherein the detected message (or at least one of the detected messages) includes an indication of a frame number of the message, and wherein the extracting step for the type of message (or at least one of the types of message) includes the steps of:
   extracting the frame number, or a component of it, from the detected message; and
   testing its value.

7. A method as claimed in claim 6, wherein the network is a GSM network, and the last-mentioned type of message is a CHAN RQD message.

8. A method as claimed in claim 1, wherein the detected message (or at least one of the detected messages) includes an indication of a channel type on which the message is to be sent, or was received, across the radio interface, and wherein the extracting step for the type of message (or at least one of the types of message) includes the steps of:
   extracting the channel type from the detected message; and
   testing its value.

9. A method as claimed in claim 8, wherein the network is a GSM network, and the last-mentioned type of message is a CHAN ACTIV, EST REQ, SMSBREQ or SMSBC message.

10. A method as claimed in claim 9, wherein said groups of control channel combinations includes Group iv, Group v and Group vi, and further comprising the step of analyzing the extracted information to determine whether the control channel group configuration of said monitored cell has a Group iv, Group v or Group vi control channel combination.

11. A method as claimed in claim 1, wherein the detected message (or at least one of the detected messages) includes an indication of a paging group to which one of the mobile stations belongs, and wherein the extracting step for the type of message (or at least one of the types of message) includes the steps of:
   extracting the paging group from the detected message; and
   keeping track of the highest paging group so extracted.

12. A method as claimed in claim 11, wherein the network is a GSM network, and the last-mentioned type of message is a PAGING CMD message.

13. A method as claimed in claim 1, wherein the network is a GSM network, and the messages are monitored at the Abis interface of the network.

14. An apparatus for determining information about a cellular mobile radio network comprising a fixed part providing radio coverage in a plurality of cells and mobile stations for communicating with the fixed part across a radio interface each cell using a group of control channels which are configured in accordance with configuration messages which are passed in the network when the cell is to be configured or reconfigured, the apparatus comprising:

means for monitoring signalling messages of a cell which are passed in the network generally more frequently than the configuration messages;

means for detecting one of the monitored messages which is of a first predetermined type; and means for extracting information from the detected message relating to the control channel group configuration of the cell.

15. A method of determining information about a cellular mobile radio network comprising a fixed part providing radio coverage in a plurality of cells and mobile stations for communicating with the fixed part across a radio interface, each cell having a control channel group configuration that has one or more groups of control channel combinations and that is configured in accordance with configuration messages which are passed in the network when the cell is to be configured or reconfigured, the method comprising the steps of:

monitoring signalling messages of a cell which are passed in the network generally more frequently than the configuration messages;

detecting one of the monitored messages which is of a first predetermined type;

extracting information from the detected message relating to the control channel group configuration of the monitored cell; and analyzing said extracted information to determine whether the control channel group configuration of the monitored cell has one or more of said groups of control channel combinations.

16. The method of claim 15, wherein said groups of control channel combinations includes first, second and third groups, and wherein said analyzing step determines whether the control channel group configuration of the monitored cell has the first group, the second group or a combination of the first and third groups.

* * * * *